3,728,291
CATALYST COMPOSITION FOR POLYURETHANE FOAM

Felix P. Carroll, Chester, and Harold A. Green, Havertown, Pa., assignors to Air Products and Chemicals, Inc., Philadelphia, Pa.
No Drawing. Continuation-in-part of application Ser. No. 842,692, July 17, 1969. This application June 21, 1971, Ser. No. 155,226
Int. Cl. C08c 17/08; C08d 13/08; C08f 47/10
U.S. Cl. 260—2.5 AC         5 Claims

ABSTRACT OF THE DISCLOSURE

In preparing polyurethane foams, triethylenediamine diformate salt is employed in combination with an amount of HPI (1-(2-hydroxypropyl) imidazole) not greater than the amount of the salt. Such amine catalyst compositions permit wider latitude concerning concentration of the organic tin catalyst, thus avoiding the critical sensitivity to concentration when using triethylenediamine alone as the amine catalyst. The blend of formate salt and HPI has other significant advantages over previously taught catalysts.

CROSS REFERENCE TO PARENT APPLICATION

This is a continuation-in-part of Ser. No. 842,692 filed July 17, 1969, now abandoned.

FIELD OF INVENTION

The invention relates to heterocylic compounds containing two nitrogen atoms, to derivatives of triethylene diamine and imidazole, and to the use of blends of such derivatives as the amine catalyst for preparing cellular polyurethane organic plastic foams.

GENERAL BACKGROUND OF INVENTION

In manufacturing polyurethane foams, advantages have been achieved by the use of the combination of an organic tin salt and a triethylenediamine type of amine catalyst. For products having density of from about 1.3 to about 1.7 pounds per cubic foot, reliable production has been available. When attempts were made to prepare higher density, flexible polyurethane foam for products such as slab stocks for seat cushioning, insulating layers for clothing, or other products having a density within a range of from about 2 to about 4 pounds per cubic foot, difficulty has been encountered in attempting to prepare such materials. The smaller concentration of water per 100 parts of polyol as compared with the concentrations employed in lower density foam has led to significant alterations in the performance of the precursor as it is transformed into a flexible polyurethane.

Polyurethane foam manufacturers prepare precursor compositions which react to form the desired polyurethane foam. Certain machines, polyisocyanato compounds, polyols, surfactants, modifiers, and catalysts are marketed to a plurality of polyurethane foam manufacturers. Many manufacturers prefer freedom to vary formulations by changing one or more of the reactants, and the suppliers of the separate components collaborate by marketing materials which are suitable for many variations in formulation. Manufacturers have developed skill in recognizing that an example of one formulation teaches skilled polyurethane chemists hundreds of formulations which are obvious modifications thereof by reason of the equivalency of a group of polyols with an illustrative polyol, the equivalency of a group of polyisocyanato materials with an illustrative isocyanate, and the equivalency of a group of surfactants with an illustrative silicone. However, as regards catalysts and mixtures of catalysts, polyurethane technologists have recognized that substitution of equivalents is not a practical rule, and that specific proportions of specific catalysts are necessary. As regards polyisocyanate and polyol, variations in formulations, and adaptations of formulations to different mixing machines, and the like have been treated as routineering modifications obviously available to average technologists. Variations of significant extent as regards concentrations of each of the several catalysts has been treated as unobvious and as generally requiring adherence to the instructions and specifications of catalyst manufacturers.

Mixing machines pumping regulated proportions of reactants into the precursor mixture have limited precision and chronological uniformity. When two catalyst-containing systems are mixed in preparing a precursor, the ratio of one catalyst to the other can vary significantly because of the inherently less than perfect precision of the mixing machine and the chronological non-uniformity inherently resulting therefrom. Catalyst systems which are suitable when each catalyst is precisely measured but which have a narrow latitude of proportions of the catalyst components, can be unsuitable for industrial production of polyurethanes because of the inherently non-uniform performance of the proportionating systems of the mixing machines.

Heretofore laboratory tests involving precise measurement of precursors featuring a catalyst combination of triethylenediamine and tin octoate have provided superior results throughout a wide range of foam densities. There has been only very limited use of such catalyst combination in producing foam densities of 2 to 4 pounds per cubic foot because of the narrow latitude of concentration of tin catalyst permissible for a given concentration of triethylenediamine. The tin octoate and triethylenediamine cannot be preserved for months in storage in the same solution. Because such mixtures have not had shelf-stability for years, it has been standard practice to pump the two components to the mixing chamber by two separate streams. The inherent variation in the proportions which resulted from such separate pumping of the streams has produced such erratic performance that machine use of the highly desirable catalyst combination for production of foam densities of the 2–4 pounds per cubic foot range has been relatively small. Instead, tertiary amines such as N-ethyl morpholine have been employed in combination with tin octoate in producing foams of the 2–4 lbs. per cubic foot density range. Although triethylenediamine is far more active, is needed in smaller quantities, and has other advantages over N-ethyl morpholine, the single disadvantage of narrow latitude in combination with tin octoate when employed to achieve foam densities of the 2–4 pounds per cubic foot density has been sufficient to prevent the use of triethylenediamine in many factories. Such narrow latitude of triethylenediamine for 2–4 pounds per cubic foot density has significantly curtailed the market for triethylenediamine and has accordingly been a problem persistently attacked in an effort to increase consumption of triethylenediamine.

Green 3,448,065 describes and claims methods of polymerizing urethanes using catalyst mixtures comprising hydroxyalkyl derivatives of imidazole. Beitchman 3,294,753 explains that salts of triethylenediamine have some effectiveness in catalyzing polyurethane.

SUMMARY OF THE INVENTION

In accordance with the present invention, a polyurethane foam is prepared from a precursor containing 1-(2-hydroxypropyl) imidazole and the diformate salt of triethylenediamine. The range of concentration of the organic tin component of the catalyst system has commercially acceptable latitude when employing such mixture of HPI and the diformate salt of triethylenediamine. The creaming time is sometimes prolonged without excessive prolongation of the rising time of the mixture by such regulation of catalyst composition. In certain embodiments, the amount of water in the precursor is controlled to be from about 1.5 to about 2 parts per 100 parts of liquid polyol, whereby a flexible foam having a density of about 2 to about 4 pounds per cubic foot is produced. In certain embodiments, the concentration of silicone surfactant is significantly lower than conventional.

ethylenediamine alone (i.e. Control A) had a tensile strength and elongation which were less satisfactory than with the catalyst of Example 1. Hydroxypropyl imidazole, abbreviated as HPI has the following structure:

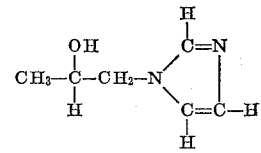

and is also known as 1-(2-hydroxypropyl) imidazole. The data are shown on Table 1.

TABLE 1.—PROCESSABILITY IMPROVEMENT IN LOW WATER FOAMS USING TRIETHYLENEDIAMINE DIFORMIC ACID (DFA-TEDA) SALT AND HYDROXYPROPYLIMIDAZOLE (HPI)

TDI Index: 110
TDI 80/20: 29.2
Polyol M.W. 3,500: 100.0
Water: 2.0
Silicone: 1.0

| Catalyst (PHP) | (DFA-TEDA)$_{73}$(HPI)$_{27}$ (0.15) | | | | | TEDA (0.12) | | | | TEDA (0.05) NEM (0.10) | | |
|---|---|---|---|---|---|---|---|---|---|---|---|---|
| Code | Example 1 | | | | | Control A | | | | Control B | | |
| Stannous octoate (PHP) | .15 | .18 | .20 | .22 | .25 | 0.18 | 0.20 | 0.22 | 0.25 | 0.18 | 0.20 | 0.22 |
| Cream time, sec | 10 | 8 | 7 | 6 | 6 | 8 | 7 | 7 | 6 | 7 | 8 | 7 |
| Rise time, sec | 250 | 170 | 158 | 150 | 125 | 145 | 150 | 140 | 140 | 265 | 240 | 165 |
| Foam properties: | | | | | | | | | | | | |
| Air flow, c.f.m | 2.35 | 2.40 | 2.80 | 1.28 | 0.93 | 1.85 | 1.44 | 1.27 | 0.86 | 2.90 | 1.54 | 1.07 |
| Density, lbs./ft.$^3$ | 2.83 | 2.83 | 2.66 | 2.82 | 2.57 | 2.82 | 2.75 | 2.71 | 2.74 | 2.94 | 2.89 | 2.86 |
| Cells/linear in | 56 | 56 | 58 | 62 | 54 | 64 | 51 | 51 | 56 | 47 | 54 | 58 |
| Tensile, lbs./in.$^2$ | 23.4 | 18.8 | 20.2 | 21.7 | 19.6 | 13.0 | 13.3 | 13.2 | 13.1 | 22.2 | 22.0 | 16.4 |
| Elongation, percent | 326 | 237 | 269 | 279 | 264 | 136 | 135 | 141 | 133 | 257 | 260 | 184 |
| Tear resistance, lbs./in | 2.70 | 2.32 | 2.03 | 2.25 | 1.75 | 1.12 | 1.58 | 1.26 | 1.23 | 2.68 | 2.38 | 2.90 |
| Resiliency, percent rebound | 51 | 53 | 51 | 50 | 36 | 55 | 54 | 53 | 47 | 52 | 52 | 50 |
| Compression load, deflection percent | 0.60 | 0.61 | 0.63 | 0.65 | 0.61 | 0.62 | 0.65 | 0.64 | 0.63 | 0.67 | 0.68 | 0.67 |
| Compression set 90% deflection on height, 22 hrs. at 158° F | 3.2 | 3.1 | 4.25 | 4.3 | 4.35 | 3.4 | 2.7 | 2.8 | 2.5 | 3.4 | 3.2 | 8.2 |

ILLUSTRATIVE EMBODIMENTS OF THE INVENTION

Reference is made to a plurality of examples for clarifying the nature of the invention, and such examples are deemed to be of illustration of the versatility and effectiveness of the novel catalyst systems.

Example 1

A control catalyst designated as Control A consisted of 0.12 part of triethylenediamine per 100 parts of polyol. A control catalyst designated as Control B consisted of 0.10 part of N-ethyl morpholine plus 0.05 part of triethylenediamine per 100 parts of liquid polyol. The performance characteristics of Control Catalysts A and B were compared with the performance of the catalyst of Example 1, consisting of 27% by weight of hydroxypropyl imidazole and 73% by weight of the diformic acid salt of triethylenediamine. The precursor composition contained at least 0.15 part of the mixture per 100 parts of liquid polyol. Such catalyst was evaluated also at concentrations of 0.18, 0.20, 0.22, and 0.25 part per 100 parts of polyol. At a concentration of 0.15 part of the mixture per 100 parts of polyol, the precursor included 0.04 part of hydroxypropyl imidazole, 0.06 part of triethylenediamine and 0.05 part of formate per 100 parts of liquid polyol.

A polypropylene ether glycerol having a molecular weight of 3500 was employed in a foam formulation containing 2.0 parts of water and 1.0 part of silicone surfactant. The tolylene di-isocyanate (80–20 mixture of the two isomers) was employed in an amount of 29.2 parts per 100 parts of polyol, thus providing a TDI index of 110. A series of preparations were made to determine the effect of various concentrations (i.e. 0.15, 0.18, 0.20, 0.22, and 0.25 part per 100 parts of polyol) of stannous octoate. Superior results were achieved by the use of the catalyst mixture of Example 1. It will be noted that the flexible polyurethane resulting from the use of tri- The data of Table 1 indicated that the catalyst blend of Example 1 had commercially attractive tin latitude for use in formulations featuring water of the magnitude of 2 parts and silicone surfactant of the magnitude of one part per 100 parts of polyol.

It should be noted that the tensile strength of the Example 1 foam (21.7 #/in.$^2$) is 63% superior to the tensile strength of the foam prepared from catalyst Control A at 0.22 PHP concentration of stannous octoate. Similarly foam prepared with the catalyst of Example 1 had 279% elongation, and thus was 97% superior to the 141% elongation of the foam derived from catalyst Control A. The data of Table 1 establish that the Example 1 catalyst promotes formation of foam products having commercially acceptable tensile strength and commercially acceptable elongation throughout a wider range of concentration of stannous octoate than shown for either Control A or Control B.

Table 2 provides supplemental evidence of the superiority of the catalyst of Example 1. A series of flexible polyurethane foams were prepared to evaluate the latitude of formulation appropriate in using a catalyst mixture consisting of 73 parts by weight of triethylenediamine diformate salt and 27 parts by weight of hydroxypropyl imidazole, that is, the catalyst blend of Example 1. The bun size was 1 foot cube prepared during a 12-second pour from a Hennecke machine having a pin impeller, a barrel of about 100 millimeter by 59 millimeter and an orifice size of about 100 mm. by 14 mm. The mixing speed was 4200 r.p.m. and the throughput was at the rate of 7.9 kg. per min. The machine had 5 streams metered to provide a formulation corresponding to a precursor containing 100 parts of polyol (a polypropoxyglycerol of 3500 molecular weight such as Voranol 3500). The temperature of the polyol was adjusted to be reasonably uniform at 73° F. The tolylene di-isocyanate of stream 2 was adapted to provide a TDI index of 110. The water and amine in stream 3 included 1.75 parts of water (instead of the 2 parts of the previous table) and an amount of the DFA-TEDA:HPI blend providing proportion of amine indicated in Table 2. In stream 4, 0.7 part of silicone surfactant (instead of 1 part of silicone in the previous table) was provided in dioctyl phthalate as a diluent, thereby permitting more precise regulation of the proportions. Similarly, in stream 5, the tin octoate catalyst was supplied in a dioctyl phthalate diluent. The several runs demonstrated that a reasonable range of properties of interest could be achieved by suitable variation in the concentration of the catalyst blend and the tin octoate, as shown in Table 2.

used in a concentration of 0.375 part per 100 parts of polyol. In Runs E-G, such catalyst mixture concentration was at the 0.50 part level. Data relating to the performance of the catalyst systems are set forth in Table 3.

TABLE 3.—(DFA-TEDA)$_{73}$(HPI)$_{27}$ BLEND IN LOW WATER FOAMS

TDI Index: 110
TDI 80/20 (PHP): 29.2
Voranol CP-3500: 100.0
Water (PHP): 2.0
Silicone (PHP): 1.0

| (DFA-TEDA)$_{73}$(HPI)$_{27}$ blend (PHP) | 0.375 | | | | 0.50 | | | |
|---|---|---|---|---|---|---|---|---|
| Run code | A | B | C | D | E | F | G | H |
| Stannous octoate (PHP) | 0.15 | 0.20 | 0.25 | 0.30 | 0.15 | 0.20 | 0.25 | 0.30 |
| Cream time, sec | 12 | 8 | 7 | 6 | 9 | 7 | 6 | 5 |
| Rise time, sec | 130 | 128 | 125 | 130 | 132 | 135 | 140 | 136 |
| Foam properties: | | | | | | | | |
| Density, lbs./ft.³ | 2.90 | 2.78 | 2.80 | 2.82 | 2.77 | 2.77 | 2.74 | 2.67 |
| Air flow, c.f.m. | 1.74 | 2.48 | 1.60 | 0.14 | 1.61 | 1.38 | 1.21 | 0.64 |
| Cells per linear in | 44 | 47 | 47 | 40 | 44 | 44 | 54 | 40 |
| Tensile, lbs./in.² | 12.8 | 13.1 | 13.0 | (¹) | 14.6 | 15.5 | 15.3 | 16.2 |
| Elongation, percent | 158 | 158 | 158 | (¹) | 208 | 233 | 225 | 225 |
| Tear resistance, lbs./in | 1.74 | 1.84 | 1.44 | (¹) | 1.93 | 2.00 | 1.75 | 1.82 |
| Compression load deflection 25% | 0.45 | 0.50 | 0.51 | (¹) | 0.50 | 0.51 | 0.49 | 0.48 |
| Compression set 90% deflection on height, 22 hrs. at 158° F | 3.9 | 5.8 | 4.5 | (¹) | 8.3 | 6.9 | 6.1 | 10 |

¹ High amount of closed cells.

Such data indicate that there is wide latitude concerning concentration of either the stannous octoate or Example 1 mixture catalyst, thus permitting the flexible urethane slab manufacturer to have confidence that minor variations in catalyst concentration will not unduly jeopardize foam quality.

Control procedures were evaluated for estimating the marginal effect of omitting the hydroxypropyl imidazole. Samples of cubic foot buns were prepared using the

TABLE 2

| Run | Blend providing parts of TEDA per 100 parts of polyol | Stannous octoate per 100 parts of polyol | Creaming time, seconds | Rising time, seconds | Density lbs./ft.³ | Airflow, c.f.m. | Cells per inch |
|---|---|---|---|---|---|---|---|
| A | 0.200 | 0.15 | 7 | 205 | 3.29 | 0.27 | 47 |
| B | 0.375 | 0.15 | 6 | 160 | 3.42 | 0.34 | 51 |
| C | 0.500 | 0.15 | 6 | 165 | 3.18 | 0.55 | 62 |
| D | 0.750 | 0.15 | 0-2 | 155 | 3.00 | 0.33 | 65 |
| E | 0.200 | 0.22 | 7 | 195 | 3.43 | 0.26 | 65 |
| F | 0.375 | 0.22 | 6 | 150 | 3.26 | 0.09 | 65 |
| G | 0.500 | 0.22 | 4-5 | 155 | 3.11 | 0.22 | 76 |
| H | 0.75 | 0.22 | 0-2 | 144 | 3.07 | 0.46 | 65 |
| J | 0.15 | 0.25 | 8 | 183 | 2.82 | 1.28 | 51 |
| K | 0.15 | 0.30 | 8 | 155 | 2.73 | 0.93 | 51 |

The data of Table 2 establish the utility of the catalyst blend of Example 1 for systems utilizing a wide latitude of concentrations and proportions of stannous octoate as a co-catalyst.

EXAMPLE 2

A precursor composition having ingredients equivalent to those in Table 1, was evaluated at two higher levels of concentration of the catalyst blend of Example 1. A polypropyleneoxy derivative of glycerol having a molecular weight of about 3500, (e.g. generally equivalent to a polyol marketed as Voranol CP-3500) was employed. The 80/20 mixture of isomers of tolylene diisocyanate was employed at a 110 index, thus requiring 29.2 parts per 100 parts of polyol. The formulation employed about 2 parts of water per 100 parts of polyol. The amount of the desired catalyst mixture was more than double the optimum amount of Table 1, and the performance, although in some cases below commercial requirements, enhances the evidence that reasonable latitude in catalyst concentrations are feasible without radical loss of operability of the polyurethane formulation. In Runs A-D, the mixture of 27 parts of propoxy imidazole and 73 parts of the diformate salt of the triethylenediamine was previously described Hennecke machine. The formulation was modified to employ merely the diformate salt of triethylenediamine as the amine catalyst. The formulation included the TDI at 110 index, Voranol CP-3500, 2.0 parts of water, and 1.0 part of silicone surfactant. Data relating to the runs are in Table 4.

TABLE 4

| Run | DFA-TEDA (PHP) | Stannous octoate (PHP) | Cream. | Rise. | Density, lbs./ft.³ | Airflow, c.f.m. | Cells/linear inch |
|---|---|---|---|---|---|---|---|
| A | 0.15 | 0.15 | 13 | 195 | 2.93 | 2.20 | 51 |
| B | 0.15 | 0.20 | 12 | 170 | 2.79 | 2.30 | 51 |
| C | 0.15 | 0.25 | 12 | 165 | 2.57 | 3.20 | 58 |
| D | 0.21 | 0.15 | 13 | 135 | 3.06 | 2.19 | 47 |

The performance characteristics indicate that the diformate salt of triethylenediamine has effectiveness as a catalyst, but that the blend with hydroxypropyl imidazole is better for certain applications of commercial interest.

Example 3

A series of samples were prepared by hand-mixing formulations containing amine catalysts using various proportions of hydroxypropyl imidazole. The foam collapsed when hydroxypropyl imidazole was employed without any triethylenediamine diformic acid salt. A basis was established for using about equal parts by weight as the upper limit for the concentration of the HPI in the HPI-DFA·DETA blends. Data relating to the preparations are shown in Table 5.

TABLE 5

| Run | HPI/DFA-TEDA proportions | Cream time, sec. | Rise time, sec. | Density, pounds per cubic foot |
|---|---|---|---|---|
| A | 100/0 | 7 | 125 | Collapsed |
| B | 50/50 | 8 | 140 | 3.2 |
| C | 40/60 | 8 | 145 | 3.3 |
| D | 30/70 | 7 | 145 | 3.4 |
| E | 25/75 | 9 | 145 | 2.8 |
| F | 20/80 | 10 | 150 | 3.3 |
| G | 10/90 | 10 | 165 | 3.1 |

In the sample preparation, for each 100 parts of 3500 molecular weight polypropyl glycerol, the precursor contained 0.7 part of L-520 silicone surfactant, 1.75 parts of water, 26.6 parts of TDI (index of 110), 0.15 part of tin octoate, and 0.6 part of the catalyst blend.

The data indicate that hydroxypropyl imidazole, when employed in a blend of not more than the weight of the triethylenediamine salt, is useful in polyurethane catalysis.

Example 4

A plurality of sample cubes of flexible polyurethane foam were prepared using the Hennecke foam machine. The polypropoxy glycerol was similar to the polyol of previous examples. Silicone surfactant concentration was maintained at 1 part and water concentration at 2 parts per 100 parts of polyol. The amine catalyst blend consisted of equal parts by weight of hydroxypropyl imidazole and diformic acid triethylenediamine salt. The results are shown in Table 6.

TABLE 6

| Run | (DFA-TEDA)₅₀ (HPI)₅₀, PHP | Stannous octoate, PHP | Creaming time, seconds | Rising time, seconds | Density, lbs./ft.³ | Airflow, c.f.m. | Cells per inch |
|---|---|---|---|---|---|---|---|
| A | 0.375 | 0.25 | 7 | 125 | 2.80 | 1.60 | 47 |
| B | 0.5 | 0.15 | 11 | 160 | 2.84 | 1.195 | 44 |
| C | 0.5 | 0.20 | 9 | 153 | 2.85 | 0.975 | 51 |
| D | 0.5 | 0.25 | 8 | 142 | 2.78 | 0.595 | 54 |
| E | 0.5 | 0.30 | 8 | 140 | 2.76 | 0.268 | 62 |
| F | 0.73 | 0.15 | 11 | 160 | 2.74 | 1.43 | 51 |
| G | 0.73 | 0.20 | 9 | 147 | 2.67 | 0.963 | 54 |
| H | 0.73 | 0.25 | 7 | 138 | 2.76 | 1.15 | 54 |
| J | 0.73 | 0.30 | 7 | 130 | 2.62 | 0.098 | 47 |

The data of Table 6 indicate that the catalyst blend is useful throughout a reasonable range of concentration of tin salt, thus providing latitude of commercial interest.

Example 5

Heretofore it has been standard practice to employ surfactants in a cellular plastic formulation within concentration ranges based upon the amount of plastic employed and generally with little concern about either the concentration or choice of type of foaming agent, whether of the volatile liquid type, thermally unstable compound type, chemical reaction type, gas mixing type, or other type of foaming agent. Silicone surfactants have generally been employed in a concentration of about 0.7 to about 1.5 parts of silicone per 100 parts of polyol, and such range has been deemed advisable without regard to whatever other changes were made in the formulation of the precursor. Surprisingly it has been discovered that the processability of polyurethane foam precursor containing about 1.75 pHp water to about 2 pHp water is improved by the use of about 0.25 to about 0.35 pHp silicone surfactant. As shown in Table 7, superior results were obtained using a silicone concentration of 0.25 pHp.

TABLE 7

TDI index: 110
TDI 80/20: 27.0
3,500 M.W. polypropoxyglycerol: 100.0
Water: 1.75
(DFA-TEDA)₇₃ (HPI)₂₇: 0.30

|  | Low silicone | | High silicone | |
|---|---|---|---|---|
| PHP silicone | 0.25 | 0.25 | 0.70 | 0.70 |
| PHP stannous octoate | 0.15 | 0.22 | 0.15 | 0.22 |
| Cream time, sec | 2 | 1 | 8 | 9 |
| Rise time, sec | 175 | 168 | 240 | 205 |
| Foam properties: | | | | |
| Density, lbs./ft.³ | 3.17 | 3.05 | 3.50 | 3.27 |
| Air flow, c.f.m | 1.64 | 0.92 | 0.92 | 0.15 |
| Cells/in | 54 | 53 | 53 | 58 |
| Tensile, lbs./in.² | 12.8 | 14.3 | 11.6 | (¹) |
| Elongation, percent | 150 | 181 | 122 | (¹) |
| Tear resistance, lbs./in | 1.75 | 2.10 | 2.00 | (¹) |
| Compression load deflection 25% | 0.60 | 0.58 | 0.68 | (¹) |
| Compression set 90% deflection on height, 22 hrs. at 158° F | 4.69 | 9.18 | 3.40 | (¹) |

¹ High amount of closed cells.

Such performance data established the superiority of the use of about 0.25 silicone PHP over 0.70 silicone PHP. Superior elongation is achieved by the use of the lower silicone. Particularly significant is the wider latitude of stannous octoate which is feasible using 0.25 instead of 0.70 PHP silicone. Moreover the rise time is advantageously shorter using the low concentration of silicone of the 0.25 to 0.35 range. The improved processability by low silicone is significant when preparing foams with low amounts of water such as 1.75 or 2 PHP.

Example 6

A series of samples of polyurethane foam were prepared using certain standard components, proportions, and procedures with emphasis upon the variation in concentrations of catalysts. The components which were uniformly employed in the various runs were:

| | PHP |
|---|---|
| Polypropoxyglycerol (Voranol CP-3500) | 100 |
| Tolylene di-isocyanate (TDI Index of 110) | 27 |
| Water | 1.75 |
| Silicone | 0.70 |

Some of the procedures of Example 1 were employed.

The series of tests utilized triethylenediamine as a component of the catalyst system. Some of the Control runs employed triethylenediamine in the regular manner, and are identified by Catalyst Code R. Some of the Control runs utilized the triethylenediamine in about twice its weight of solvent (e.g. diethylene glycol), and are identified by the catalyst code S. The solution was employed in amounts sufficient to provide a designated concentration of triethylenediamine. In the runs of the example, triethylenediamine was only 40% of the catalyst composition, identified by the catalyst code WT (symbolizing wide latitude in the tin-containing catalyst) and had the composition:

| | |
|---|---|
| triethylenediamine diformate salt | 73 |
| hydroxypropyl imidazole | 27 |

The effect of altering the proportions of tin component in the preparation of polyurethane foam samples can be recognized from a study of the data of Table 8.

TABLE 8

| Run | Catalyst code | Catalyst quantity sufficient to provide triethylene diamine (PHP) | Tin octoate catalyst (PHP) | Activity | | Density, lb./cu. ft. | Air flow, c.f.m. | Cells per inch | Tensile, lb./sq. in. | Elongation, percent | Tear resistance, lb./in. | Resiliency, percent rebound |
|---|---|---|---|---|---|---|---|---|---|---|---|---|
| | | | | Cream, sec. | Rise, sec. | | | | | | | |
| Controls: | | | | | | | | | | | | |
| a | R | 0.15 | 0.15 | 4 | 157 | 3.0 | 0.94 | 60 | 15.0 | 203 | 1.80 | 47 |
| b | R | 0.15 | 0.18 | 3 | 195 | 2.80 | 0.18 | 69 | High amount of closed cells | | | |
| c | R | 0.15 | 0.20 | 1 | 242 | Severe shrinkage and foam collapse | | | | | | |
| d | R | 0.12 | 0.15 | 8 | 195 | 3.30 | 1.09 | 64 | 14.3 | 178 | 1.80 | 50 |
| e | R | 0.12 | 0.18 | 8 | 190 | 3.13 | 0.63 | 62 | 14.1 | 167 | 1.4 | 50 |
| f | R | 0.12 | 0.20 | 7 | 175 | 3.04 | 0.32 | 62 | High amount of closed cells | | | |
| g | S | 0.15 | 0.15 | 7 | 180 | 2.84 | 1.13 | 65 | 14.6 | 181 | 1.41 | 35 |
| h | S | 0.15 | 0.18 | 6 | 150 | 3.42 | 0.24 | 65 | High amount of closed cells | | | |
| j | S | 0.15 | 0.20 | 4 | 128 | Severe shrinkage and foam collapse | | | | | | |
| Example: | | | | | | | | | | | | |
| k | WT | 0.12 | 0.15 | 8 | 240 | 3.50 | 0.92 | 53 | 11.6 | 122 | 2.00 | 53 |
| m | WT | 0.12 | 0.18 | 7 | 225 | 3.23 | 0.19 | 54 | 11.6 | 122 | 2.0 | 53 |
| n | WT | 0.12 | 0.20 | 7 | 225 | 3.34 | 0.69 | 56 | 11.1 | 114 | 1.21 | 48 |
| p | WT | 0.15 | 0.15 | 6 | 195 | 3.1 | 2.10 | 62 | 14.4 | 183 | 2.02 | 50 |
| q | WT | 0.15 | 0.18 | 5 | 173 | 3.15 | 1.08 | 64 | 13.6 | 160 | 1.57 | 49 |

It should be noted that precise proportions of triethylenediamine, as the only amine catalyst in the controls, and tin catalyst can promote formation of polyurethane foam, but that foam collapse and/or closed cells result if the proportion of tin catalyst is increased, as shown in runs a–j, thus establishing the seriousness of the tin latitude problem. The use of the blend containing the diformate salt of triethylenediamine and hydroxypropyl imidazole permits production of polyurethane foam throughout a wider range of tin concentrations (runs k–q), thus establishing that the present invention solves the long-standing problem of narrow latitude for tin catalyst.

The invention claimed is:

1. In a method of producing a flexible polyurethane foam from a reaction mixture comprising
   (a) a polyol having at least two alkanol groups per molecule;
   (b) water;
   (c) an organic isocyanate having at least two isocyanato groups per molecule;
   (d) triethylene diamine in catalytic amounts; and
   (e) stannous octoate in catalytic amounts,
said method causing transformation of said mixture from a flowable liquid to a flexible foam, the improvement which comprises:
   adding said triethylene diamine in the form of its diformate salt; adding hydroxypropyl imidazole in a catalytic amount by weight not greater than the amount of the triethylene diamine salt in the reaction mixture; and controlling the amount of water added to the reaction mixture to be within the range from about 1.5 to about 2 parts of water per 100 parts of polyol, said polyol being a polyether polyol based on propylene oxide whereby a flexible foam having a density in the range from about 2 to about 4 pounds/cubic foot is produced.

2. The method of claim 1 in which the reaction mixture contains a mixture of from about 2 to about 6 parts of the diformate salt of triethylene diamine per 1 part of hydroxypropyl imidazole.

3. The method of claim 1 in which the reaction mixture contains a silicon surfactant in a concentration within the range from about 0.25 to about 0.35 part per 100 parts of polyol, such controlled concentration of the silicone surfactant being effective in producing useful cellular polyurethane throughout a range of from about 0.1 to about 0.3 part of stannous octoate per 100 parts of polyol.

4. A polyurethane catalyst composition for the polymerization of a polyether polyol based on propylene oxide, said polyol having at least two alkanol groups per molecule, and an organic isocyanate having at least two isocyanate groups per molecule to produce a flexible foam having a density in the range from about 2 to about 4 pounds/cubic foot, which composition comprises stannous octoate in catalytic quantities, the diformate salt of triethylene diamine in sufficient quantities to make available during the polymerization a catalytic amount of triethylene diamine and hydroxypropyl imidazole in a catalytic amount by weight not greater than the amount of said diformate salt, said composition having a wider latitude of stannous octoate concentrations available than prior art polyurethane catalysts.

5. A catalyst composition in accordance with claim 4 consisting of from about 4 to 5 parts of the diformate salt of triethylene diamine per 1 part of hydroxypropyl imidazole.

References Cited

UNITED STATES PATENTS

| 3,520,835 | 7/1970 | Chandley | 260—2.5 AC |
| 3,448,065 | 6/1969 | Green | 260—77.5 NC |
| 3,294,753 | 12/1966 | Beitchman | 260—77.5 AC |
| 3,010,963 | 11/1961 | Erner | 252—426 |

FOREIGN PATENTS

| 839,185 | 6/1960 | Great Britain | 260—2.5 AC |
| 651,638 | 11/1962 | Canada | 260—2.5 AC |

OTHER REFERENCES

Polyurethanes: Chemistry and Technology; vol. I, Saunders and Frisen; Interscience; N.Y.; 1962; pp. 165, 227–232.

DONALD E. CZAJA, Primary Examiner

C. W. IVY, Assistant Examiner

U.S. Cl. X.R.

252—426; 260—75 NC, 77.5 AC